United States Patent [19]

Ray

[11] Patent Number: 4,506,551
[45] Date of Patent: Mar. 26, 1985

[54] TRANSDUCER SELECTING SYSTEM

[75] Inventor: David J. Ray, San Juan Capistrano, Calif.

[73] Assignee: Becton Dickinson and Company, San Juan Capistrano, Calif.

[21] Appl. No.: 430,048

[22] Filed: Sep. 30, 1982

[51] Int. Cl.³ .................... G01N 29/00; G08B 21/00
[52] U.S. Cl. .................... 73/660; 340/683; 364/508
[58] Field of Search ......... 73/583, 602, 593, 587, 73/801, 658, 660; 340/27 R, 683; 364/508

[56] References Cited

U.S. PATENT DOCUMENTS

| | | | |
|---|---|---|---|
| 3,400,578 | 9/1968 | Frarey et al. | 73/593 X |
| 3,641,550 | 2/1972 | Lynas et al. | 73/583 |
| 3,758,758 | 9/1973 | Games et al. | 340/683 X |
| 3,783,680 | 1/1974 | Mason | 73/654 |
| 4,213,114 | 7/1980 | Cochard | 73/593 X |
| 4,408,294 | 11/1983 | Imam | 364/508 |

Primary Examiner—Charles A. Ruehl
Attorney, Agent, or Firm—Marvin H. Kleinberg

[57] ABSTRACT

A transducer selecting system for use in a noisy environment can operate in a vibration monitoring system using a data processor. Narrow band signals representing transducer information at selected frequencies of interest are subtracted from broad band signals representing information and background noise. The magnitude of the background noise components of each transducer is used to select from among duplicative transducers or to signal potentially unreliable information.

14 Claims, 5 Drawing Figures

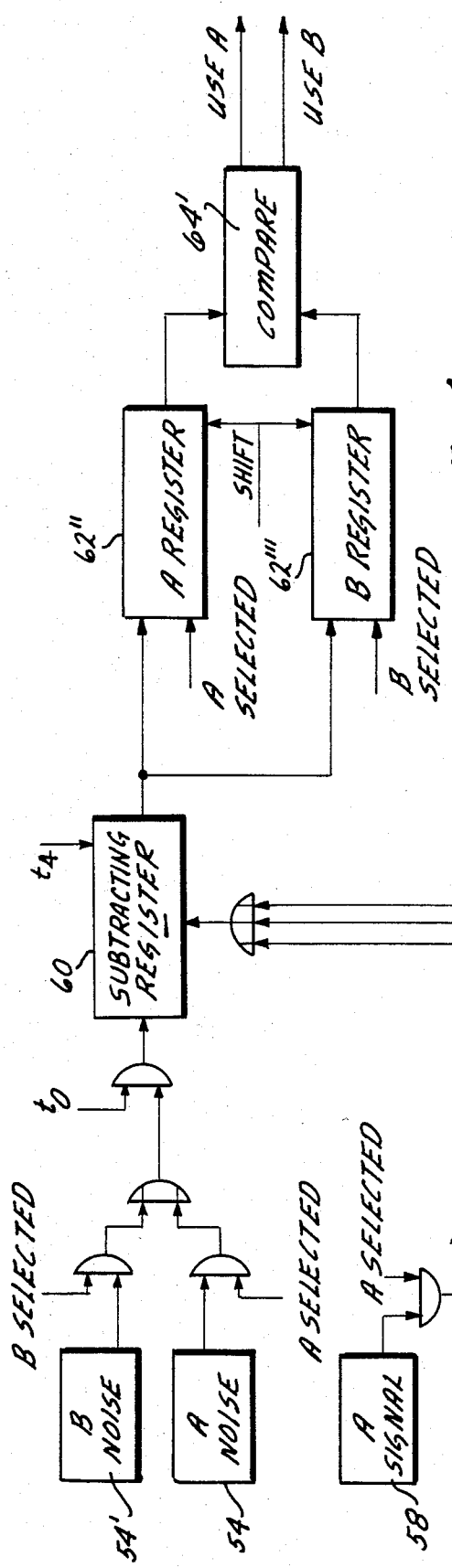
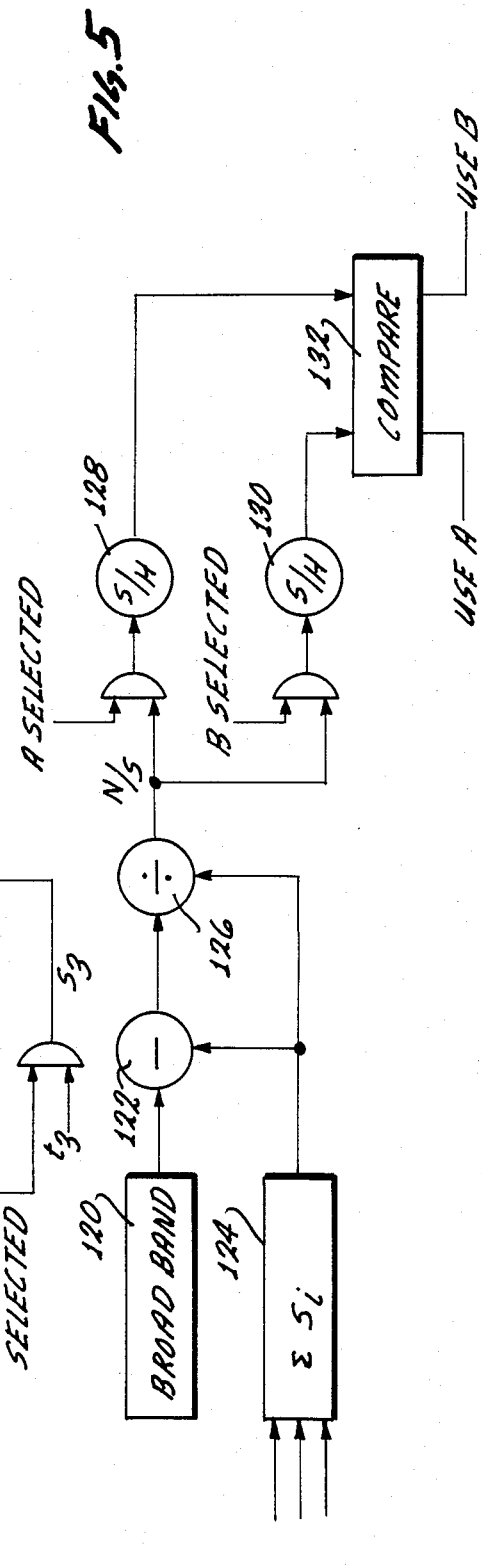
FIG.4
FIG.5

TRANSDUCER SELECTING SYSTEM

The present invention relates to vibration monitoring systems and, more particularly, methods and apparatus for selecting transducers operating in a noisy environment.

BACKGROUND OF THE INVENTION

The detection and analysis of vibration in machines having large rotating components has long been known and utilized as a technique to detect incipient failures. Even techniques of limited reliability were deemed desirable because of the catastrophic consequences of failures, not only in terms of the destructive potential of a failed rotating component, but also because of the economic losses resulting during the time required to repair or replace such components or entire machines.

The problem of incipient failure is a more serious one when the machine with the rotating component is an aircraft jet engine. The modern engine includes several concentrically mounted shafts, each rotating at a slightly different frequency. Each of the rotating shafts or spools can include a compressor-turbine assembly which in turn includes fan and turbine blades. In the intake stages the blades are used to compress incoming air, and in the output stages the blades drive the compressor.

Machinery having massive rotating components, such as jet aircraft engines but also including large motor generators, turbines and the like, may experience bearing failures or may, through problems of wear or accident, become unbalanced and impose unacceptable loads upon the bearing and the shaft housings.

The problem, of course, is of greatest gravity when a passenger-carrying jet airliner is involved. The large fans and turbines, which are integral parts of the jet engine, can, upon catastrophic failure, penetrate the aircraft hull and cause substantial injury to the cabin and occupants, as well as impair the air worthiness of the aircraft.

For some time, techniques have been available to monitor the vibrations of rotating machinery and to signal dangerously high vibration amplitudes, or, at least, signal large incremental changes over the otherwise normal patterns of vibration. Such techniques are also available to assist in the balancing of the rotating components to keep vibrations at acceptably low levels. Limiting vibration has long been deemed a factor in prolonging the life of the bearings.

While such techniques are applicable to aircraft, the environment of the modern jet engine tends to create a high "noise" level due to the sympathetic vibrations of component parts of the aircraft. When operating, the jet engine generates a broad spectrum of frequencies including harmonics which usually excite most if not all resonances. Accordingly, it is difficult to monitor the vibrations that are directly related to the main rotating components of an engine in the presence of all of the other components of "noise."

Prior art techniques have utilized filters in an attempt to isolate the vibrations attributable to the engine components, and these filtered signals are then processed to provide a quantitative display that a trained observer could interpret. The observer, noting the amplitude over a period of time, can then judge if a malfunction is threatened or if one exists.

In the prior patent to Cochard, U.S. Pat. No. 4,213,114 of July 15, 1980, a system was disclosed utilizing collocated transducers which were alternately sampled. A broad-band channel is used which includes a broad-band filter whose output is integrated, rectified and, if selected, can be displayed. The integrater output is also applied to two or more narrow band channels corresponding to the coaxial shafts which have different frequencies of rotation.

A tachometer is associated with each shaft and is used to control phase-locked loop frequency multipliers whose outputs are applied to monostable circuits which control conventional analog tracking filters, the output signals of which depend only on the amplitude of the basic frequency of the input signal from the integrater.

It has been found that analog circuits, in general, must be designed for specific applications, and, further, tend to be susceptible to noise and electrical disturbances which could adversely affect the integrity of the output signals. Further, the frequencies of interest, which range from 20 Hz to 200 Hz, are not easily accomodated in analog circuits.

A novel system based upon a digital computer has been created and has been disclosed in the copending application of David Ray and Nikul Kapadia, Ser. No. 344,561, filed Feb. 1, 1982, and assigned to the assignee of the present invention. The analog output of a transducer, such as an accelerometer was converted into digital signals. Tachometer signals were provided as a pulse train whose frequency was related to the frequency of the rotating component of interest. Standard digital components, including counters and memory devices, were utilized to generate a sampling pulse train whose frequency is a predetermined, integral fraction of the frequency of the rotating component, so that a suitable number of samples of the accelerometer output can be digitized to represent adequately the quantities sensed by the transducer.

A nonrecursive digital filter was created utilizing a memory in which coefficients are stored. Each digitized sample was processed through the digital filter to create a digitized output. The digital computer then converted the filter output to an RMS value which was converted in a digital to analog converter. The resultant analog signal was applied to drive a meter display.

Because a general purpose digital computer was employed in conjunction with memory, the apparatus could, through programming, be adapted to perform other functions. For example, vibrations at virtually any frequency of interest could be detected and displayed.

A problem that had not been dealt with heretofore involved the reliability of the several vibration transducers and the question of selecting from among the transducers providing signals of differing magnitude. Prior systems, such as Cochard, utilized a pair of collocated transducers on the assumption that both would not fail in identical fashion. The prior systems recognized that output signals of differing magnitudes can be recognized as a system "fault" and might give rise to an alarm.

The important question was, which of the transducers is providing the correct reading? The transducer providing the signal of the dangerous vibration condition might be defective and another transducer, signalling vibration within safe limits might be correct and should be believed. The prior art solution was to signal a "fault" if either transducer signalled an out-of-limit vibration or if their signals differed by more than a permitted amount.

It has been discovered that it is possible, using the information that is available in the system, to derive a signal representing the background noise component from each of the transducers. The transducer signalling the least background noise can then be deemed most credible. Alternatively, one can normalize the noise components by the total signal values for each transducer and select, as most credible, the transducer with the lowest normalized noise component.

Yet another alternative method would be to average the data signals and use the averaged value to normalize the noise components, and selecting the transducer having the lowest normalized noise value. All of these methods can be implemented as simple computations considering the data that is available to a data processor in digital form, using the system of the copending Ray-Kapadia application.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 4 is a block diagram of an alternative transducer selecting circuit of the present invention; and FIG. 5 is a block diagram of an alternative transducer selecting system employing analog rather than digital circuits.

Figure 1:
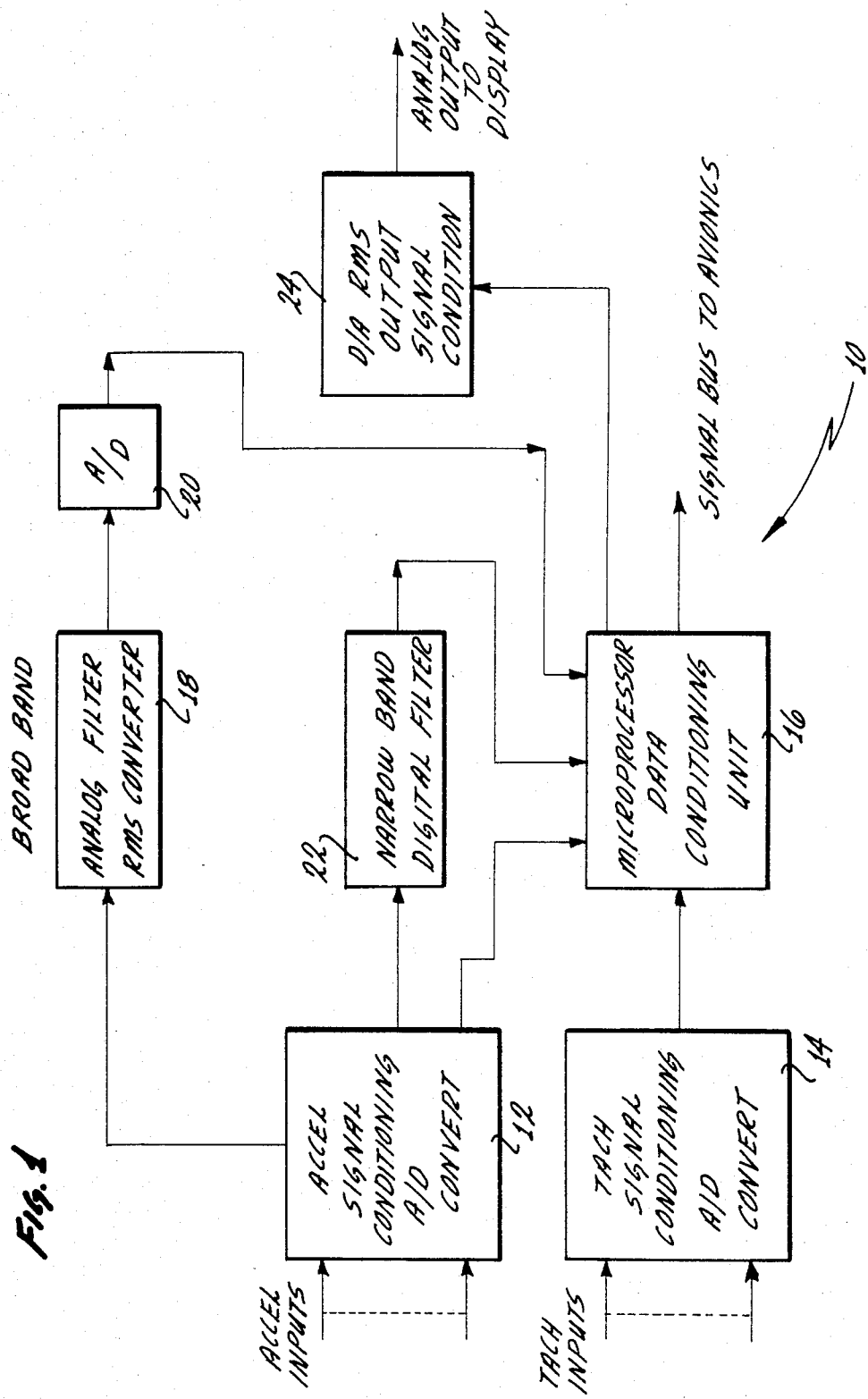
FIG. 1 is a block diagram of a vibration analysis system according to the invention of the copending application.

Turning first to FIG. 1, there is shown in block diagram form, a vibration analyzing system 10 which is adapted to operate and monitor the vibration of an aircraft jet engine. A plurality of inputs from accelerometers mounted on one or more jet engines, are applied to an accelerometer signal conditioning and analog to digital converter unit 12. A plurality of tachometers, one monitoring each major rotating component of each jet engine to be monitored are applied to a tachometer signal conditioning and analog to digital converter unit 14. The resulting digital signals from the accelerometer signal conditioning unit 12 and the tachometer signal conditioning unit 14 are applied to a microprocessor-based conditioning unit 16.

Because the industry is more accustomed to dealing with velocity signals rather than acceleration signals, an integration stage is included in the analog acceleration signal conditioning circuitry 12. The conditioned accelerometer signals, still in analog form, are applied to a broad band analog filter and RMS converter 18 the output of which is applied to an analog to digital converter 20. The signals, now in digital form, are supplied to the microprocessor-based data conditioning unit 16.

The microprocessor data conditioning unit 16 generates data sampling signals which are related to the tachometer input. As the rotation rates of the various components vary, the sampling rate must also vary, so that the same, predetermined number of samples per cycle are obtained. The data sampling signals are used to gate accelerometer signals into the analog to digital converter portion of the accelerometer signal conditioning unit 12. The digitized accelerometer signals from the accelerometer signal conditioning and A to D converting unit 12 are applied to a narrow band, nonrecursive digital filter network 22, the output of which is applied to the microprocessor-based data conditioning unit 16.

The microprocessor-based data conditioning unit 16 supplies digital output signals representing desired information to an output signal conditioning circuit 24, which converts the digital signals to analog signals to drive appropriate display devices.

Under control of the microprocessor-based data conditioning unit 16 and analog switches (not shown), the accelerometer output from the instruments on a particular jet engine is filtered at the rotational frequency of each of the major rotating components.

For example, if the aircraft utilizes a pair of collocated accelerometers on each engine, and each engine has three rotating spools, $N_1$, $N_2$ and $N_3$, then in separate computations, the system of the present invention will measure the RMS velocity which can be scaled to any description such as peak or average value of vibration, for each of the accelerometers at the frequency of each of the spools. The use of a nonrecursive digital filter enables a much narrower band width with substantial suppression of noise outside the pass band.

Figure 2:
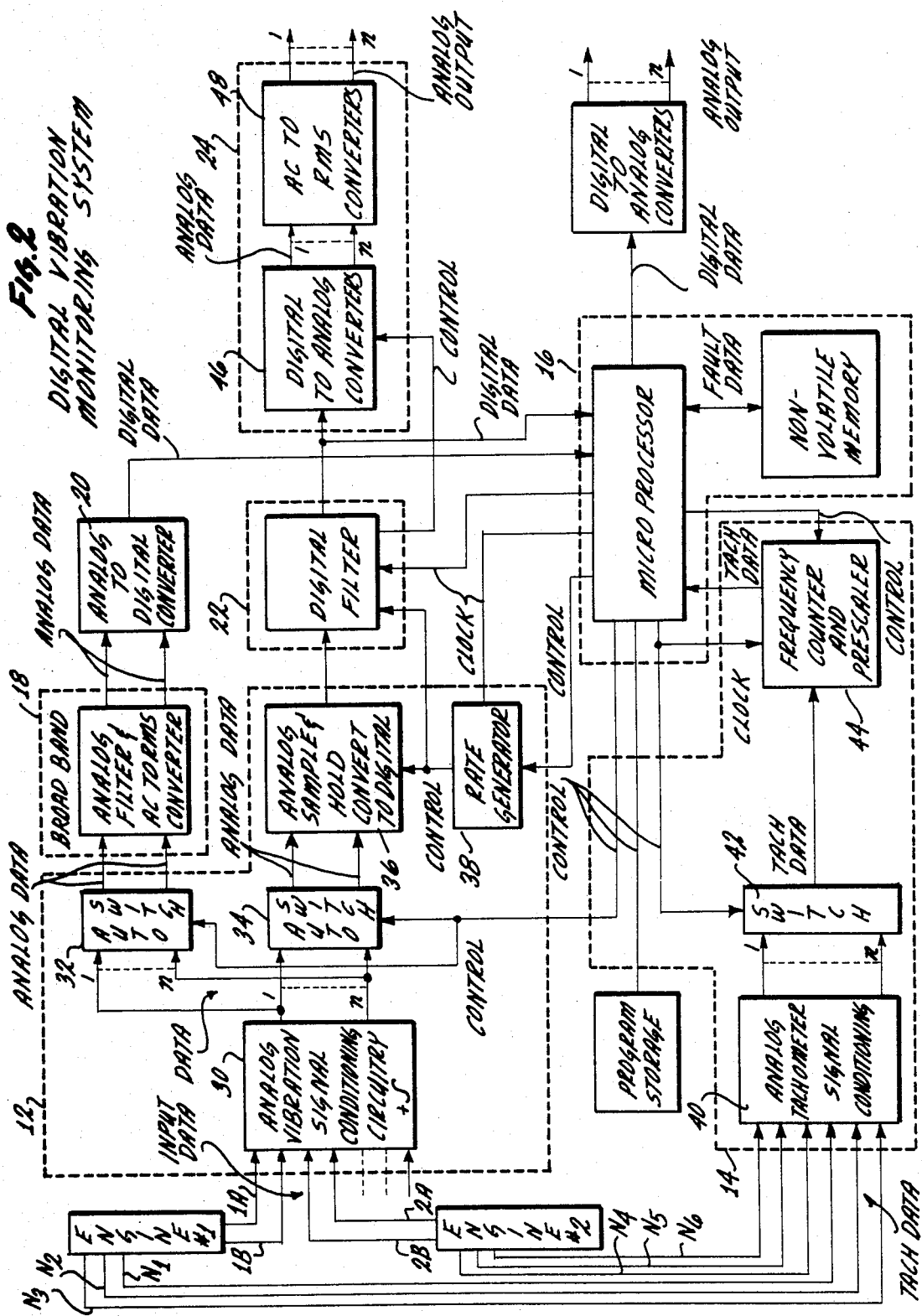
FIG. 2 is a block diagram in somewhat greater detail of the preferred embodiment of the system of FIG. 1.

Turning next to FIG. 2, there is shown, in a more detailed block diagram, the system 10 as adapted to operate in conjunction with a twin engine aircraft, each engine of which has three rotating spools, each capable of rotating at a different frequency. As shown in FIG. 2, engine #1 has spools $N_1$, $N_2$ and $N_3$. Associated with engine #1 are accelerometers 1A and 1B. Engine #2, similarly, has rotating spools $N_4$, $N_5$ and $N_6$, and vibrations are detected by accelerometers 2A and 2B.

The accelerometer signal conditioning block 12 includes an integrating circuit as a part of the analog vibration signal conditioning circuitry 30 which, on several lines, applies velocity data to first and second switching devices 32, 34. The first switching device 32 applies selected analog signals to the broad band analog filter and RMS converter 18. The second switching device 34 applies analog data to a sample and hold circuit 36, which includes an analog to digital conversion capability.

A programmable counter-rate generator 38 is controlled by the microprocessor 16 to sample the velocity signals at a predetermined rate, based upon the frequency of rotation. In the preferred embodiment, the sampling rate is 18 samples per rotational cycle, or a sample for each 20 degrees of rotation. The sampled analog signal is then converted into a digital signal which is applied to the narrow band nonrecursive digital filter 22.

The tachometer analog input data is applied to the tachometer signal conditioning block 14 which includes analog tachometer circuits 40 which are connected to a switch 42 for selecting a particular tachometer input. A frequency counter and prescaler 44 includes a programmable counter coupled to the microprocessor 16. The frequency counter and prescaler 44 converts the tachometer input, generally a multiple of the rotational frequency, to a signal train having a rate more nearly equal to the actual rotating frequency.

This can be accomplished through the use of a high speed (for example 2 MHz) clock which is counted down by a predetermined constant. The constant is supplied by the microprocessor 16. The output of the prescaler 44 would then be a pulse train at either the frequency of rotation or, a predetermined multiple of that frequency.

The microprocessor 16 utilizes the information supplied by the frequency counter and prescaler 44 to determine the constant that must be inserted into the rate generator 38 so that the sampling intervals will represent a data input every 20 degrees of rotation.

The output of the digital filter 22 is applied to the microprocessor 16 for data comparison and to check the validity of the system. The microprocessor 16 also can convert digital filter data to RMS or such other convenient description data such as average or peak value for driving display devices.

Figure 3:
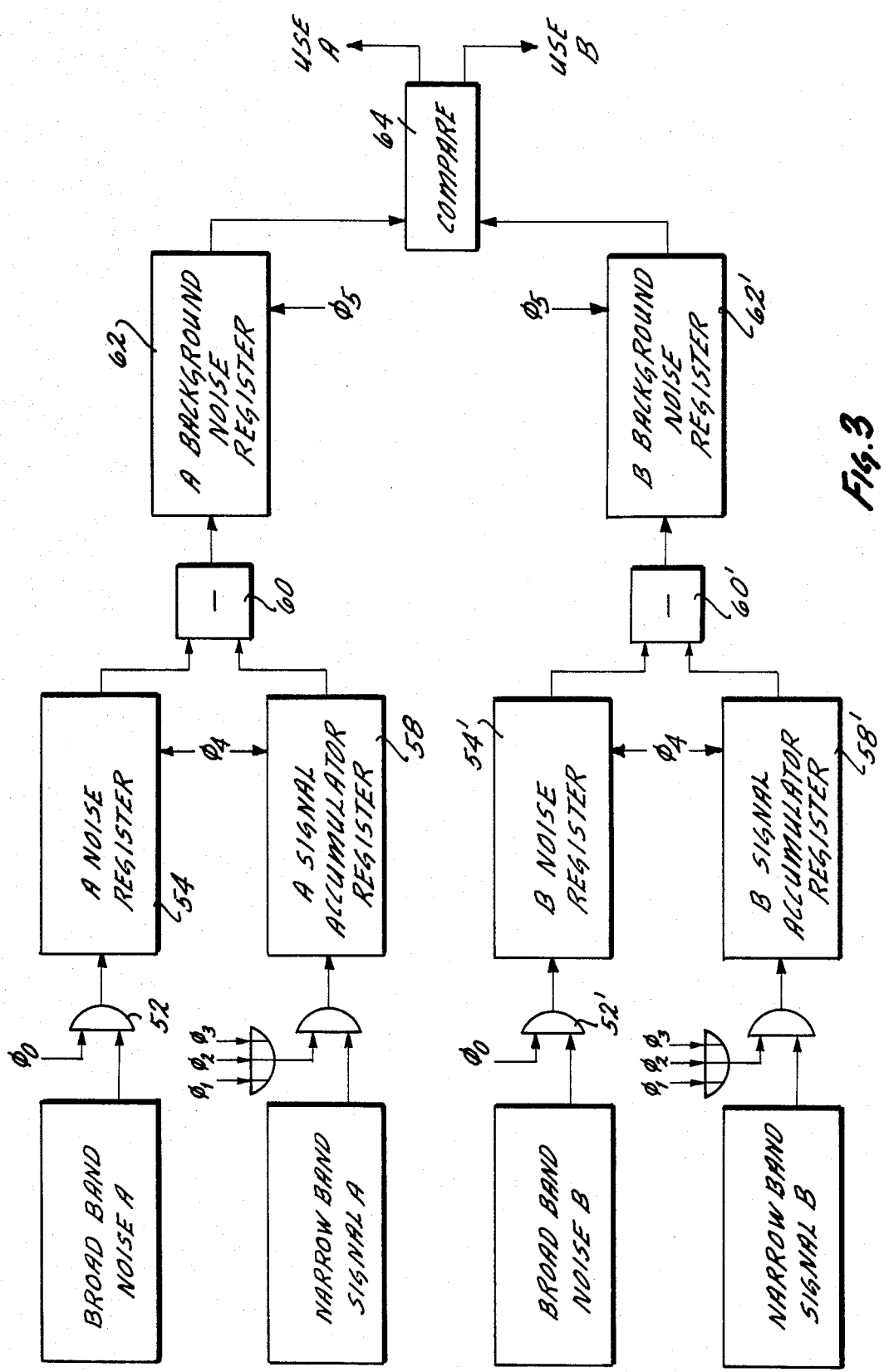
FIG. 3 is a block diagram of a transducer selecting system of the present invention.

Turning next to FIG. 2, the present invention is mechanized in the form of individual elements which perform the same functions that can be accomplished in the microprocessor of the Ray-Kapadia application. FIG. 3 illustrates the invention in terms of more conventional hardware blocks. Assuming a pair of collocated accelerometer transducers are mounted on each of the engines as illustrated in FIG. 2, FIG. 3 deals only with the pair of transducers of a single engine.

It will be clear to those skilled in the art that either duplicate circuits can be provided for the second engine or, alternatively, the circuits of FIG. 3 can be time-shared between the two engines. In yet an alternative embodiment not shown, the blocks of FIG. 3 could be further reduced by using conventional time-sharing methods.

Assuming the signals are processed in the circuits of FIG. 2, above, a broadband noise signal from accelerometer A, suitably digitized, will be provided on the digital data output line from the analog-to-digital converter 20. Similarly, the digital data stream output of the narrow-band digital filter 22 represents, sequentially, the vibration representing signal at each of the frequencies of the several engine spools $N_1$, $N_2$ and $N_3$.

To simplify the processes of the present invention, a series of special clock signals designated phase 0 ($\phi_0$) through phase 5 ($\phi_5$) will be used so that the various signals can be collected and properly processed in timely fashion. During phase 0 ($\phi_0$), the broad-band noise from accelerometer is properly processed. During phase 0, the broad-band noise from accelerometer A is applied to a gate 52, the other input of which is the phase 0 signal ($\phi_0$). The output of gate 52 is applied to an A noise register 54 in which the digital signal representing the total system noise is stored. During subsequent intervals, phase 1 ($\phi_1$), phase 2 ($\phi_2$) and phase 3 ($\phi_3$), the narrow-band digital filter 22 generates the narrow-band digital signals representing, respectively, the amplitude of the velocity signal at the frequency of each of the spools, in turn. These signals are accumulated in an A signal accumulator register 58, which sums and stores the signal components At phase 4 ($\phi_4$), the contents of the A noise register 54 and the A signal accumulator register 58 are applied to a subtractor 60. The difference output signal is stored in and background noise register 62. After phase 4 ($\phi_4$) the background noise register 62 contains the digitized noise signal after all of the signal components of interest have been subtracted from the broad-band noise signal.

Similarly, for accelerometer B, an and gate 52' is enabled by the phase 0 ($\phi_0$) signal to store the digitized broad-band noise signal in a second B noise register 54'. The narrow-band signals from the B accelerometer are sequentially applied and accumulated in the B signal accumulator register 58' after being suitably gated. At phase 4 ($\phi_4$), the contents of the noise and signal accumulator registers 54', 58' are subtracted in the subtracting circuit 60' and the difference is applied to a B background noise register 62'.

Under the control of a phase 5 ($\phi_5$) signal, the contents of the two background noise registers 62, 62' are applied to a comparator circuit 64 which supplies either a "USE A" or a "USE B" signal, depending upon the relationship of the applied input noise signals. If the B noise Signal is greater than the A Noise Signal, then the "USE A" signal line is energized. Alternatively, if the A Noise Signal is greater than the B Noise Signal, then the B signal is to be utilized and the "USE B" signal is produced. The transducer with the lowest background noise is preferred on the assumption that the "noisier" transducer is "less" reliable.

An alternative embodiment has been set out in FIG. 4. In this version, the contents of the signal accumulator registers 58, 58' are subtracted from the noise registers 54, 54' once to achieve the background noise and, again, to obtain an indication of the relationship between "signal" and background noise. If the quantities are represented in straight binary code, then multiplication of the contents of the signal registers 58, 58' by 2 is a accomplished merely by adding an extra digit or by shifting the contents of the accumulator register one stage, relative to the contents of the noise register. This can be accomplished by, for example, delaying the contents of the accumulator registers 58, 58' by one bit time before serially applying the contents to the subtracting register 60 or by providing an extra stage in the subtracting register.

In order to mechanize the operation, gating signals "A Selected" and "B Selected" are used to prevent confusion of signals from the A Registers and B Registers. The "A Selected" signal gates the output of the A Noise Register 54 and the A Signal Register 58. Similarly, "B Selected" signal gates the B Noise Register 54' and the B Signal Register 58'. "Or" gates are provided so that the selected register can apply its contents at the appropriate time ($t_0$ thru $t_3$) to the Subtracting Register circuit 60.

At a first-time interval $t_0$, the Noise Registers 54, 54', which contain signals representing background noise plus signal information is stored in the Subtracting Register circuit 60. As noted above, during different time periods, the Signal Registers will have the vibration signals corresponding to each of the frequencies of interest, representing the vibration of each of the rotating spools. These vibration signals are sequentially acquired and a time interval can be assigned to each.

Accordingly, during the $t_1$ interval, a first vibration signal, $S_1$, is subtracted from the noise signal in the Subtracting Register 60. At $t_2$, a second vibration signal, $S_2$, is subtracted and, finally, at $t_3$, a third vibration signal $S_3$ is subtracted from the contents of the Subtracting Register. In the next time interval, $t_4$ the contents of the Subtracting Register 60 are dumped into an A Register 62'' or a B Register 62''', depending upon whether "A Selected" or "B Selected" signal is provided.

After the A Register 62″ and the B Register 62‴ have been updated with new information, a "SHIFT" signal is provided. The registers apply their contents to a Compare Network 64′ which effects the comparison of the two signals and selects a transducer, based upon the predetermined criteria.

In this embodiment, the number stored in the background noise register will be further reduced by the magnitude of the signal component. However, the same comparator selection rules apply, still following the assumption that the transducer with the lowest noise component relative to the signal is considered preferable.

A further alternative embodiment can be mechanized by the apparatus of FIG. 4 but with a modification. The contents of the signal accumulator registers 58, 58′ are subtracted from the noise registers 54, 54′ to provide the background noise magnitudes and to obtain an indication of the "signal" and the background noise.

If the contents of the "noise" registers 54, 54′ are then subtracted from the contents of the respective signal registers 58, 58′, the register having the greater remainder would suggest that the corresponding transducer is "more" reliable. Accordingly, the system would utilize the transducer providing the "preferred" signal and lower noise component.

It is clear that those skilled in the art may provide a comparable circuit which will work on analog signals, as well. In fact analog circuits could be used to generate both the signal to noise ratios and the inverse of the signal to noise ratio for purposes of determining which would be the better transducer to use. Such a circuit is shown in FIG. 5.

A broadband noise source 120 which provides an analog signal, has its output coupled to an analog subtractor circuit 122. An analog summing circuit 124 receives the filtered analog signals at each of the frequencies of interest as may be provided in the prior art circuits of Cochard for example. The output of the summing circuit is applied to the subtractor 122. The output of the subtractor is applied to the dividend input of a divider circuit 126. The output of the summing circuit 124 is applied to the divisor circuit of the divider 126.

The output of the broadband noise source could be designated N+S representing background noise plus signal. The sum of the several signals of interest collectively may be designated signal S. The output of the subtractor circuit 122 would then be the difference or the background noise component. This background noise is then divided in the divider circuit 126 to produce a background noise divided by signal which is the inverse of the more conventionally utilized signal to noise ratio. This output signal is applied to an analog sample and hold circuit 128 which is dedicated to the signal from a first transducer.

If the analog network is time shared and switched among several signal sources, then other sample and hold networks are provided, one for each transducer. In the present example, for ease in explanation, only a second transducer is provided and accordingly a second sample and hold network 130, suitably switched, is provided to receive the noise divided by signal output corresponding to the second transducer.

The outputs of the two sample and hold circuits 128 and 130 are applied to a comparator 132 which signals to the utilization networks, that either the first or "A" transducer should be used or the "B" or second transducer should be used, depending upon the selection scheme employed.

In the preferred embodiment, one would prefer the transducer that has the lowest noise to signal (highest signal to noise ratio) relationship on the assumption that the "noisiest" transducer will be the least reliable.

While the invention has been illustrated in the context of an aircraft vibration monitoring system in which colocated transducers are used, it is clear that the concept is not so limited and may be used in any situation involving a plurality of transducers operating in an extremely noisy environment. In such an application, the background noise component for each transducer is extracted. If the background noise exceeds a certain preset limit, then it may be assumed that the transducer is providing unreliable data. Alternatively, if the amplitude of the background noise is greater than the signal by more than a predetermined quantity, the transducer signal may also be deemed unreliable and unworthy of use.

The background noise signal may be "normalized" in other ways, as, for example by using the average value of the signal or the root means square signal. It is of course necessary to operate within the same units of measurement so that root mean square values are compared and/or subtracted from other root mean square values expressed in the same units such as, for example, velocity.

Modifications and variations of the present invention will become apparent to those skilled in the art. Accordingly, the scope of the invention must be determined by the claims appended hereto.

What is claimed as new is:

1. Apparatus for selecting from at least two applied signals representing detected vibrations from a corresponding number of transducers, in a system including means for providing signals representing broad band information from each transducer and narrow band filter means for providing information signals representing vibrations at frequencies of interest from each transducer, the combination comprising:
   a. first selecting means connected to the transducers for alternatively supplying signals from each transducer in a predetermined sequence;
   b. subtracting means, coupled to said selecting means and connected to receive broad band information signals and vibration information signals to produce signals representing the background noise component of said broad band information signals;
   c. comparison means for comparing the background noise signals attributable to each transducer for determining which of the transducers has the least background noise; and
   d. second selecting means coupled to the transducers and to said comparison means for applying vibration information signals to utilization circuits from the transducer having the least background noise; whereby the transducer having the least background noise during a particular comparison interval is selected to supply information.

2. The apparatus of claim 1, above, further including dividing means, connected between said subtracting means and said comparison means and coupled to the narrow band filter means to receive said background noise component signals and vibration information signals for producing signals representing normalized background noise signals; and whereby said comparison means compares normalized background noise signals for selecting the transducer with normalized background noise signals of lowest magnitude.

3. The apparatus of claim 2 including alarm means coupled to said dividing means and responsive to provide an alarm when the magnitude of the normalized background noise signal exceeds a predetermined limit.

4. The apparatus of claim 1 further including storage means for storing and presenting current values of vibration information signals and background noise signals for each transducer;
means for periodically updating said storage means with new current values; and means interposing said storage means between said subtracting means and said comparison means; whereby updated current values are compared in said comparison means and transducers are selected on the basis of updated background noise representing signals.

5. The apparatus of claim 1 including alarm means coupled to said subtracting means and responsive to provide an alarm when the magnitude of the background noise signal exceeds a predetermined limit.

6. The apparatus of claim 1 wherein said transducers are collocated accelerometers in a vibration monitoring system.

7. A method for selecting from among a plurality of transducers in a noisy environment, each transducer generating broad band information signals and narrow band information signals at frequencies of interest, to provide information to a system, the method comprising the steps of:
 a. subtracting from the broad band information signals the narrow band information signals to produce signals representing the background noise component of said broad band information signals;
 b. comparing the magnitudes of background noise signals attributable to each transducer;
 c. selecting the transducer with the least background noise;
whereby the transducer having the lowest background noise is selected to supply information to the system.

8. The method of claim 7 further including the steps of dividing the background noise signals by the several narrow band information signals for each transducer to generate normalized background noise signals, and utilizing said normalized signals from each transducer in the selecting step, whereby the tranducer with the lowest normalized background noise is selected to supply information.

9. The method of claim 8, above, including the further step of providing an alarm when the normalized background noise signals from a transducer exceeds a predetermined limit.

10. The method of claim 7 above, including the further step of providing an alarm when the background noise level of a transducer exceeds a predetermined limit.

11. The method of claim 7 wherein said system is an aircraft vibration monitoring system and said transducers are accelerometers.

12. In an aircraft condition monitoring system, apparatus for selecting from at least two applied signals representing detected vibration from a corresponding number of collocated transducers, the system including means for providing a digitized signal representing broad band information from each transducer and digital filter means for providing digitized signals representing vibration information at the frequency of interest from each transducer, the combination comprising:
 a. first selecting means for alternatively supplying signals from each transducer in a predetermined sequence;
 b. subtracting means, coupled to said selected means and connected to receive broad band information signals and vibration information signals to produce signals representing the background noise component of said broad band information signals;
 c. storage means for storing and presenting current values of vibration information signals and background noise signals for each transducer;
 d. comparison means for comparing the current background noise signals attributable to each transducer for determining which of the transducers has the least background noise; and
 e. second selecting means for applying vibration information signals from said transducer having the least background noise to utilization circuits whereby one of the transducers having the least background noise during a particular comparison interval is selected to supply information to the aircraft monitoring system.

13. Apparatus as in claim 12, above, further including means for separating vibration information signals from background noise signals to derive a qualitative signal for each transducer, whereby said qualitative signals are applied to said comparison means, and whereby the transducer with the greatest qualitative signal that is not less than the background noise signals by more than a predetermined quantity is selected to apply its information signals to the utilization circuits.

14. Apparatus as in claim 12, above, including means responsive to the magnitude of the background noise signals to generate an alarm signal when the background noise signals exceed a predetermined limit.

* * * * *